(12) United States Patent
Tanaka (10) Patent No.: US 9,224,077 B2
(45) Date of Patent: Dec. 29, 2015

(54) CONTROL APPARATUS, IMAGE FORMING APPARATUS, IMAGE FORMING SYSTEM, CONTROL METHOD, AND COMPUTER-READABLE MEDIUM

(75) Inventor: Satoshi Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/370,084

(22) Filed: Feb. 9, 2012

(65) Prior Publication Data

US 2013/0016364 A1    Jan. 17, 2013

(30) Foreign Application Priority Data

Jul. 13, 2011  (JP) ................................. 2011-155089

(51) Int. Cl.
 *G06K 15/02*    (2006.01)
 *H04N 1/40*     (2006.01)
 *G06F 3/12*     (2006.01)
 *G03G 15/08*    (2006.01)

(52) U.S. Cl.
 CPC .................................. *G06K 15/1868* (2013.01)

(58) Field of Classification Search
 USPC ..................................................... 358/1.9, 2.2
 See application file for complete search history.

(56) References Cited

U.S. PATENT DOCUMENTS

| | | | |
|---|---|---|---|
| 6,332,170 B1 * | 12/2001 | Ban .................................... | 710/6 |
| 8,749,849 B2 * | 6/2014 | Tanaka ............................ | 358/3.1 |
| 2005/0007609 A1 | 1/2005 | Itagaki et al. | |
| 2006/0152775 A1 * | 7/2006 | Itoyama et al. ................ | 358/504 |
| 2006/0197793 A1 * | 9/2006 | Takahashi et al. ............... | 347/15 |
| 2007/0236553 A1 * | 10/2007 | Kawano et al. ............... | 347/133 |
| 2008/0317482 A1 * | 12/2008 | Niijima ........................... | 399/27 |
| 2009/0116073 A1 * | 5/2009 | Nakamura .................... | 358/3.23 |
| 2009/0316173 A1 | 12/2009 | Tanaka et al. | |
| 2010/0238465 A1 * | 9/2010 | Kageyama et al. ............ | 358/1.9 |

(Continued)

FOREIGN PATENT DOCUMENTS

| | | |
|---|---|---|
| JP | 2000-324279 A | 11/2000 |
| JP | 2002-296851 | 10/2002 |
| JP | 2005-3906 | 1/2005 |

(Continued)

OTHER PUBLICATIONS

Communication from the Japanese Patent Office issued May 12, 2015 in a counterpart Application No. 2011-155089.
Communication dated Aug. 11, 2015, issued by the Japan Patent Office in corresponding Japanese Application No. 2011-155089.

*Primary Examiner* — Marivelisse Santiago Cordero
*Assistant Examiner* — Daryl Jackson
(74) *Attorney, Agent, or Firm* — Sughrue Mion, PLLC (57) ABSTRACT

A control apparatus includes an operation section, a correction section, and a controller. The operation section performs an operation for forming an image having a predetermined density. The correction section corrects a value of the density. In a case where an image formation condition is switched from a first image formation condition to a second image formation condition, when image formation under the second image formation condition is to be performed on at least a predetermined number of recording media or to be performed for at least a predetermined period, the controller performs control so that the correction section executes a process of correcting the value. When the image formation is not to be performed on at least the predetermined number of recording media or not to be performed for at least the predetermined period, the controller performs control so that the correction section does not execute the process.

8 Claims, 7 Drawing Sheets

(56) References Cited

U.S. PATENT DOCUMENTS

2011/0097130 A1* 4/2011 Hashimoto .................. 400/583
2011/0249278 A1* 10/2011 Yamazaki ..................... 358/1.2

FOREIGN PATENT DOCUMENTS

| JP | 2007-98613 A | 4/2007 |
| JP | 201026496 A | 2/2010 |

* cited by examiner

TBL1

| PRINT-DATA ID | PAGE NUMBER | SHEET-FEEDER NUMBER | SCREEN RULING |
|---|---|---|---|
| 0001 | 0001 | 01 | 85 |
|  | 0002 | 01 | 85 |
|  | ⋮ | ⋮ | ⋮ |
|  | 0100 | 01 | 85 |
| 0002 | 0001 | 02 | 134 |
|  | 0002 | 02 | 134 |
|  | ⋮ | ⋮ | ⋮ |
|  | 0050 | 03 | 85 |
| ⋮ | ⋮ | ⋮ | ⋮ |

CONTROL APPARATUS, IMAGE FORMING APPARATUS, IMAGE FORMING SYSTEM, CONTROL METHOD, AND COMPUTER-READABLE MEDIUM

CROSS-REFERENCE TO RELATED APPLICATIONS

This application is based on and claims priority under 35 USC 119 from Japanese Patent Application No. 2011-155089 filed Jul. 13, 2011.

BACKGROUND (i) Technical Field

The present invention relates to a control apparatus, an image forming apparatus, an image forming system, a control method, and a computer-readable medium.

(ii) Related Art

It is known that, in a case of forming images with electrophotographic image forming apparatuses, the density of the images changes in accordance with changes in the image forming apparatuses or changes in environments. In order to reduce the change in the density, in recent years, various propositions have been made.

SUMMARY

According to an aspect of the invention, there is provided a control apparatus including an operation section, a correction section, and a controller. The operation section performs an operation for forming an image having a predetermined density. The correction section corrects a value of the predetermined density. In a case in which an image formation condition is switched from a first image formation condition to a second image formation condition, when image formation under the second image formation condition is to be performed on at least a predetermined number of recording media or to be performed for at least a predetermined time period, the controller performs control so that the correction section executes a process of correcting the value of the predetermined density. When image formation under the second image formation condition is not to be performed on at least the predetermined number of recording media or not to be performed for at least the predetermined time period, the controller performs control so that the correction section does not execute the process of correcting the value of the predetermined density.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the drawings.

1. Exemplary Embodiment 1-1. Configuration

Figure 1:
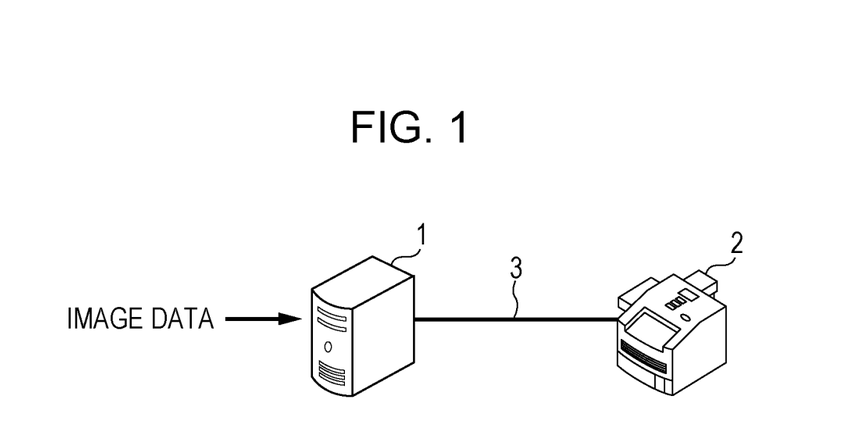
FIG. 1 is a diagram illustrating an example of a configuration of an image forming system according to an exemplary embodiment of the present invention.

FIG. 1 is a diagram illustrating an example of a configuration of an image forming system according to an exemplary embodiment of the present invention. As illustrated in FIG. 1, the image forming system includes an image processing apparatus 1 and an image forming apparatus 2. The image processing apparatus 1 receives image data from a client apparatus which is not illustrated, performs image processing on the image data, and transmits, to the image forming apparatus 2, the image data subjected to image processing. The image forming apparatus 2 receives image data from the image processing apparatus 1, and performs image formation using an electrophotographic process on the basis of the image data. The apparatuses are connected to each other via a communication line 3, such as a local area network (LAN).

Hereinafter, configurations of the individual apparatuses will be described.

Figure 2:
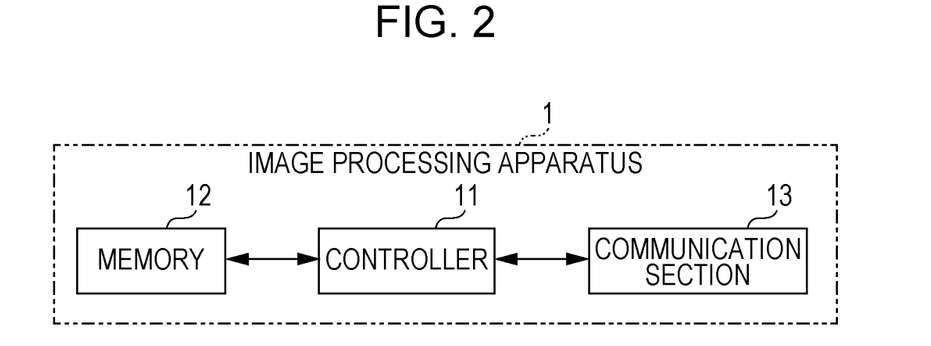
FIG. 2 is a block diagram illustrating a hardware configuration of an image processing apparatus.

FIG. 2 is a block diagram illustrating a hardware configuration of the image processing apparatus 1. As illustrated in FIG. 2, the image processing apparatus 1 includes a controller 11, a memory 12, and a communication section 13. The controller 11 includes a central processing unit (CPU), a read-only memory (ROM), and a random-access memory (RAM). The CPU executes a program stored in the ROM or the memory 12, thereby controlling the individual sections of the image processing apparatus 1. The memory 12 is a storage device such as a hard disk drive (HDD), and stores image data, programs, and so forth. Furthermore, the memory 12 stores a print-data management table TBL1.

Figure 3:
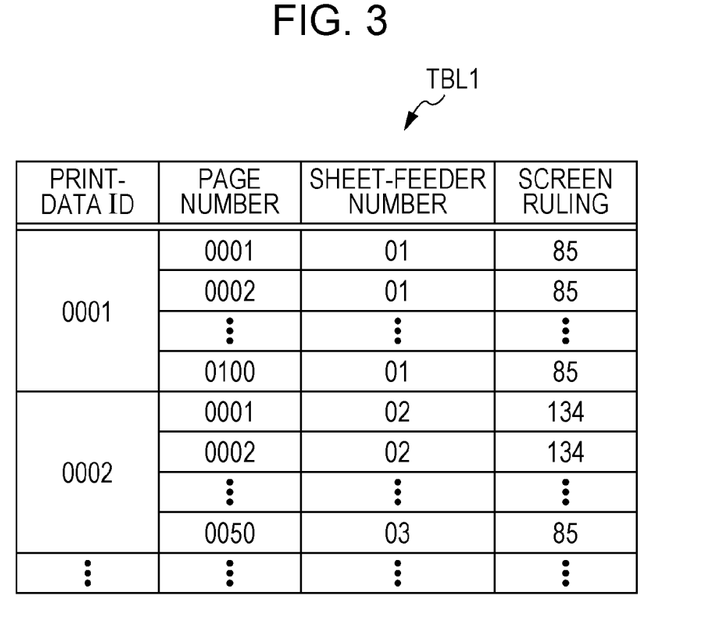
FIG. 3 is a diagram illustrating an example of a print-data management table.

FIG. 3 is a diagram illustrating an example of the print-data management table TBL1. In FIG. 3, the term "print-data ID" refers to identification information that is added to print data received from the client apparatus. The term "page number" refers to a number for distinguishing individual pages on which images are to be formed on the basis of the image data from each other. The term "sheet-feeder number" refers to a number for distinguishing a sheet feeder that stores a recording medium on which an image should be formed from the other sheet feeders, and an instruction for forming the image is provided in the image data. The term "screen ruling" refers to the number of rows of dots per one inch, and is used in a case of forming an image on the basis of the image data. When the controller 11 receives image data from the client apparatus via the communication section 13, the controller 11 registers information (hereinafter, referred to as "print-data related information") including the print-data ID, the page number, the sheet-feeder number, and the screen ruling, which are described above, for the image data in the print-data management table TBL1.

The communication section 13 includes an interface card, and performs communication with an external apparatus.

Figure 4:
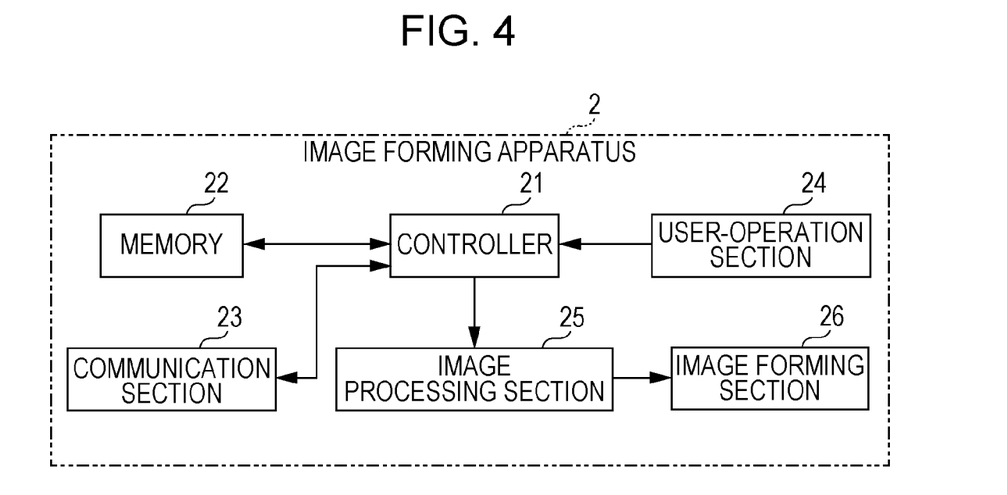
FIG. 4 is a block diagram illustrating a hardware configuration of an image forming apparatus.

FIG. 4 is a block diagram illustrating a hardware configuration of the image forming apparatus 2. As illustrated in FIG. 4, the image forming apparatus 2 includes a controller 21, a memory 22, a communication section 23, a user-operation section 24, an image processing section 25, and an image forming section 26. The controller 21 includes a CPU, a ROM, and a RAM. The CPU executes a program stored in the ROM or the memory 22, thereby controlling the individual sections of the image forming apparatus 2. The memory 22 is a storage device such as an HDD, and stores image data, programs, and so forth. Furthermore, the memory 12 stores a print-data management table TBL2. Because the data structure of the print-data management table TBL2 is the same as that of the print-data management table TBL1 stored in the image processing apparatus 1, a description thereof is omitted. When the controller 21 receives print-data related information from the image processing apparatus 1, the controller 21 registers the print-data related information in the print-data management table TBL2.

The communication section 23 includes an interface card, and performs communication with an external apparatus. The user-operation section 24 includes a user-operation key, a touch panel, and so forth, and outputs a signal to the controller 21 in accordance with a user operation.

The image processing section 25 includes an integrated circuit, such as an application specific integrated circuit (ASIC), and an image memory. The image processing section 25 stores, in the image memory, image data that is output from the controller 21, and performs image processing on the image data. The image processing section 25 performs, for example, tone correction processing. The tone correction processing is processing in which tone characteristics of an image represented by the image data is adjusted. The image processing section 25 refers to a tone correction table that is stored in the memory 22 in advance, and converts a tone value of the image data into a tone value that is associated with the tone value in the tone correction table. Furthermore, the image processing section 25 converts, using a screen ruling specified in the image data, the image data into information represented by dots. Note that the image processing section 25 may perform image processing other than tone correction processing, such as shading correction processing.

The image processing section 25 is an example of an "operation section" or a "density change section" according to an exemplary embodiment of the present invention.

The image forming section 26 forms, using an electrophotographic process, an image on the basis of image data that is output from the image processing section 25. The image forming section 26 forms, using four toners of yellow (Y), magenta (M), cyan (C), and black (K), an image on a recording medium. Here, the recording medium is a sheet of recording paper or a plastic sheet such as an overhead projector (OHP) sheet. The recording medium is an example of a "recording medium" according to an exemplary embodiment of the present invention.

Figure 5:
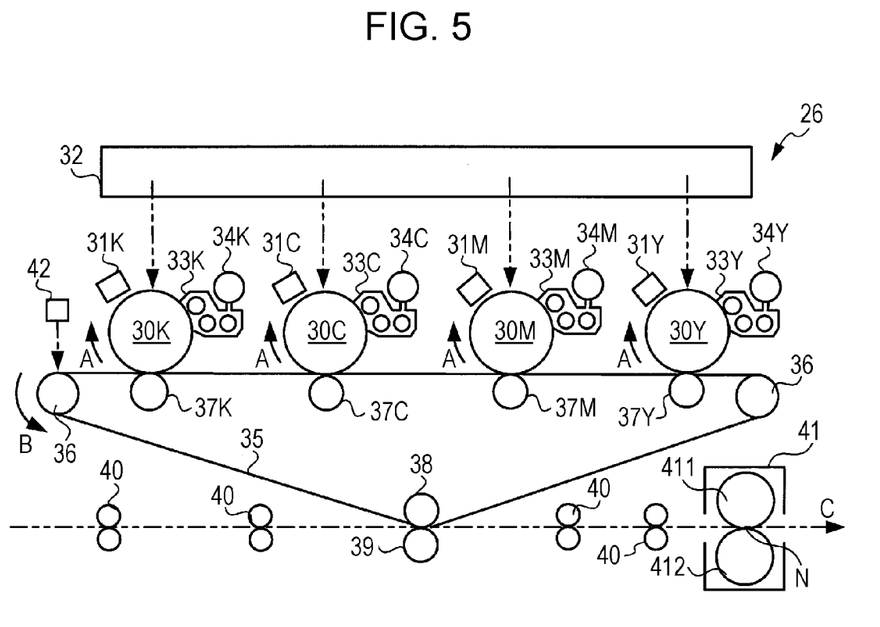
FIG. 5 is a diagram illustrating a configuration of an image forming unit.

FIG. 5 is a diagram illustrating a configuration of the image forming section 26. In FIG. 5, alphabets added to the ends of reference numerals indicate colors of toners that are used by elements denoted by the reference numerals. Regarding the elements denoted by the reference numerals including the alphabets that are added to the ends of the reference numerals and that are the only differences among the reference numerals, even when the colors of toners used by the elements are different from one another, the configurations of the elements are the same. In the description given below, when the elements do not particularly need to be distinguished from one another, the alphabets added to the ends of the reference numerals are omitted, and the elements are described.

In FIG. 5, a recording medium that is transported in the image forming section 26 has been output from a sheet feeder that is not illustrated, and is transported in a direction indicated by the broken-line arrow C. An image is formed on the surface of the recording medium while the recording medium is being transported. The image forming section 26 may include multiple sheet feeders, and the type of recording media that are stored may be changed for each of the sheet feeders. For example, the image forming section 26 may include a sheet feeder that contains sheets of coated paper, and a sheet feeder that contains sheets of uncoated paper (for example, plain paper).

Each of photoconductor drums 30 is a member having a cylindrical shape. A photoconductive film is stacked on the outer peripheral surface of the photoconductor drum 30. The photoconductor drum 30 is rotatably supported, and is placed so as to be in contact with an intermediate transfer belt 35. The photoconductor drum 30 rotates about the center of the cylindrical shape, which serves as a shaft, in a direction indicated by a corresponding one of arrows A in FIG. 5 in accordance with movement of the intermediate transfer belt 35. The photoconductor drum 30 is an example of an "image carrier" according to an exemplary embodiment of the present invention.

Each of chargers 31 is, for example, a scorotron charger, and changes the photoconductive film of the corresponding photoconductor drum 30 so that the photoconductive film has a predetermined potential. The charger 31 is an example of a "charging section" according to an exemplary embodiment of the present invention. An exposure device 32 exposures the photoconductor drums 30, which have been charged by the chargers 31, to light, thereby forming electrostatic latent images in accordance with exposure light. The exposure device 32 performs exposure on the basis of the image data that is output from the controller 21. The exposure device 32 is an example of a "light exposure section" according to an exemplary embodiment of the present invention.

Each of developing devices 33 contains a binary developer including toner of a corresponding one of colors, i.e., Y, M, C, and K, and a magnetic carrier such as ferrite powder. The developing device 33 causes the toner to adhere to the electrostatic latent image formed on the corresponding photoconductor drum 30, thereby forming a toner image. The toner image is an example of an "image" according to an exemplary embodiment of the present invention. The developing device 33 is connected to a corresponding one of toner cartridges 34 via a toner supply path, and toner is supplied, using rotational driving of a dispense motor that is not illustrated, from the toner cartridge 34 to the developing device 33. The number of rotation of the dispense motor is controlled by the controller 21 on the basis of the amount of toner that should be supplied. The developing device 33 is an example of a "developing section" according to an exemplary embodiment of the present invention.

The intermediate transfer belt 35 is a member having a shape of an endless belt, and rotates in a direction indicted by the arrow B in FIG. 5 while the intermediate transfer belt 35 is being in contact with rotating rollers 36, first transfer rollers 37, and a backup roller 38. The intermediate transfer belt 35 is an example of a "medium" according to an exemplary embodiment of the present invention. Each of the rotating rollers 36 is a member that supports movement of the intermediate transfer belt 35 and that has a cylindrical shape, and rotates about the center of the cylindrical shape, which serves as a shaft. Each of the first transfer rollers 37 is a member which faces the corresponding photoconductor drum 30 so that the intermediate transfer belt 35 is sandwiched therebetween, and which has a cylindrical shape. The first transfer roller 37 generates a potential difference between the first transfer roller 37 and the photoconductor drum 30 to transfer the toner image, which has been formed on the surface of the photoconductor drum 30, onto the surface of the intermediate transfer belt 35. The first transfer roller 37 is an example of a "transfer section" according to an exemplary embodiment of the present invention.

A second transfer roller 39 is a member which faces the backup roller 38 so that the intermediate transfer belt 35 is sandwiched therebetween, and which has a cylindrical shape. The second transfer roller 39 generates a potential difference between the second transfer roller 39 and the backup roller 38 to transfer the toner images, which have been formed on the surface of the intermediate transfer belt 35, onto a recording medium. The second transfer roller 39 is an example of the "transfer section" according to an exemplary embodiment of the present invention.

Transport rollers 40 are members that are driven by a driving device that is not illustrated, that transports the recording medium in a direction indicated by the broken-line arrow C illustrated in FIG. 5, and that has a cylindrical shape. The transport rollers 40 are rotated so as to transport the recording medium at a predetermined transport speed.

A fixing device 41 includes a fixing roller 411 and a pressure roller 412. The fixing device 41 executes a fixing process of applying heat and pressure to the recording medium, onto which the toner images have been transferred and which has been transported, in a region N that is sandwiched between the fixing roller 411 and the pressure roller 412, thereby fixing the toner images on the recording medium.

A density sensor 42 is a section that optically reads the toner images formed on the intermediate transfer belt 35. When the density sensor 42 reads each of the toner images formed on the intermediate transfer belt 35, the density sensor 42 outputs a signal indicating the density of the read toner image to the controller 21. Note that, here, the density of the toner image is obtained by dividing the amount of light emitted by the density sensor 42 by the amount of reflected light that is received by the density sensor 42. The density (an optical density) is an example of a "density" according to an exemplary embodiment of the present invention.

Note that the density sensor 42 may be placed so as to read the toner images formed on the photoconductor drums 30 or the toner images formed on the recording medium.

The configuration of the image forming section 26 has been described above.

Figure 6:
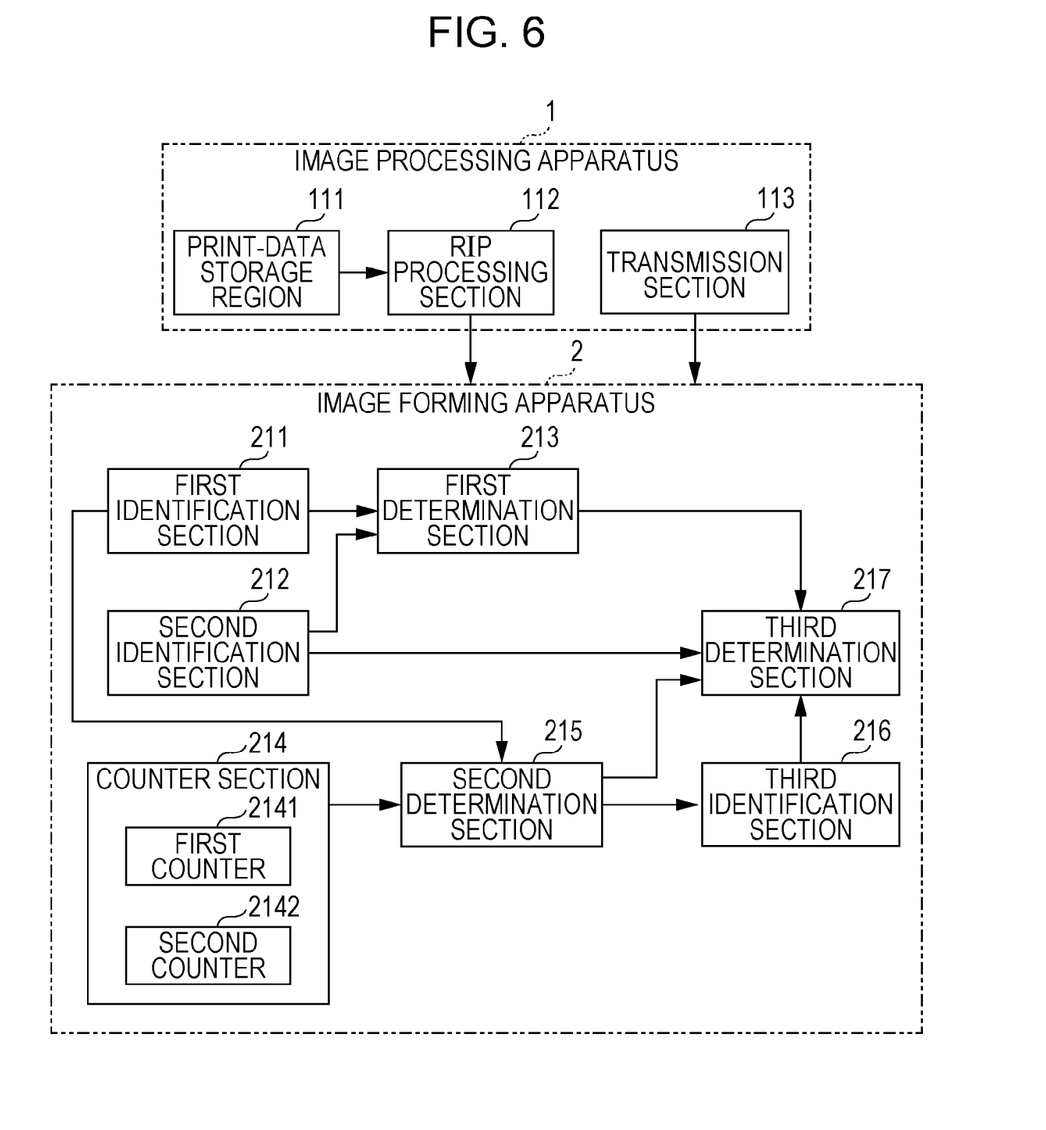
FIG. 6 is a functional block diagram of the image forming system.

Next, a functional configuration of the image forming system according to the present exemplary embodiment will be described. FIG. 6 is a functional block diagram illustrating the functional configuration. In the functional configuration, a function of the image processing apparatus 1 is realized by executing, with the CPU, an image processing program that is stored in the ROM of the controller 11. Furthermore, a function of the image forming apparatus 2 is realized by executing, with the CPU, a program that is stored in the ROM of the controller 21 and that is used for a setup execution determination process. Note that the functional configuration is a configuration which is associated with, particularly, the setup execution determination process executed by the image forming apparatus 2.

Note that, here, the term "setup (or setup process)" refers to a process of correcting an image formation condition that changes in accordance with a change in the image forming apparatus 2 over time or a change in an environment. In the present exemplary embodiment, more specifically, the term "setup process" refers to a process of correcting the tone correction table stored in the memory 22. In order to execute the setup process, first, the controller 21 instructs the image forming section 26 to form a patch image. Next, the controller 21 instructs the density sensor 42 to read the formed patch image. Next, the controller 21 compares a density value indicated by a signal that is output from the density sensor 42 with a predetermined density target value, and calculates a difference (i.e., a correction amount) between the density value and the density target value. Then, the controller 21 corrects the tone correction table on the basis of the correction amount. The controller 21 is an example of a "correction section" according to an exemplary embodiment of the present invention.

A print-data storage region 111 is a region in which print data that has been transmitted from the client apparatus and that is to be subjected to raster image processing (RIP) described below is temporarily and sequentially stored. Here, the print data includes image data (hereinafter, referred to as "PDL data") that is described in a page description language (PDL), and print control information. The print control information is information, such as a sheet-feeder number and a screen ruling for each page.

A RIP processing section 112 reads and interprets the PDL data included in the print data stored in the print-data storage region 111 to generate raster data on a page-by-page basis. The raster data generated by the RIP processing section 112, together with the print-data ID and the page number that are associated with the raster data, is transmitted via the communication line 3 to the image forming apparatus 2.

A transmission section 113 transmits the print-data related information registered in the print-data management table TBL1 to the image forming apparatus 2. For example, the transmission section 113 transmits, to the image forming apparatus 2, the print-data related information associated with the PDL data in synchronization with reading of the PDL data with the RIP processing section 112.

A first identification section 211 identifies the number of a sheet feeder that contains a recording medium onto which an image to be formed is to be transferred. More specifically, the first identification section 211 identifies, with reference to the print-data management table TBL2 stored in the memory 22, a sheet-feeder number that is registered so as to be associated with a page of the image to be formed. The sheet-feeder number is an example of an "image formation condition" according to an exemplary embodiment of the present invention.

Regarding an image that has been transferred onto a recording medium immediately prior to the image for which the sheet-feeder number is identified by the first identification section 211, a second identification section 212 identifies the number of a sheet feeder that has contained a recording medium onto which the image has been transferred. More specifically, the second identification section 212 identifies, with reference to the print-data management table TBL2 stored in the memory 22, a sheet-feeder number that is registered so as to be associated with a page immediately previous to the page of the image for which the sheet-feeder number has been identified by the first identification section 211.

A first determination section 213 determines whether or not the sheet-feeder number identified by the first identification section 211 and the sheet-feeder number identified by the second identification section 212 are the same. In other words, the first determination section 213 determines whether or not switching of a recording medium on which an image is to be formed is to be performed.

A counter section 214 counts the number of recording media on the surfaces of which images have been formed since the setup process was executed. The counter section 214 includes a first counter 2141 and a second counter 2142. The first counter 2141 and the second counter 2142 are individually associated with different sheet-feeder numbers. For example, the first counter 2141 is associated with the number of a sheet feeder that contains sheets of coated paper. The first counter 2141 counts the number of recording media on the surfaces of which images have been formed since the setup process that should be executed for a case of forming images on sheets of coated paper was executed. In contrast, the second counter 2142 is associated with the number of a sheet feeder that contains sheets of uncoated paper. The second counter 2142 counts the number of recording media on the surfaces of which images have been formed since the setup process that should be executed for a case of forming images on sheets of uncoated paper was executed.

Note that the count target which is counted by the counter section 214 may be a time which has elapsed since the setup process was executed.

A second determination section 215 identifies, in the counter section 214, a counter associated with the sheet-feeder number identified by the first identification section 211, and determines whether or not the value of the counter is equal to or larger than a predetermined threshold Th1.

A third identification section 216 identifies sheet-feeder numbers associated with a predetermined number of pages (hereinafter, referred to as "n pages") that are counted from the page of the image for which the sheet-feeder number has been identified by the first identification section 211. More specifically, for example, the controller 21 identifies, with reference to the print-data management table TBL2, sheet-feeder numbers associated with ten pages that are counted from the page of the image for which the sheet-feeder number has been identified by the first identification section 211.

The third determination section 217 determines, on the basis of results that are output from the second identification section 212, the first determination section 213, the second determination section 215, and the third identification section 216, whether or not the setup process is to be executed. More specifically, as the result of determination performed by the first determination section 213, when the sheet-feeder number identified by the first identification section 211 and the sheet-feeder number identified by the second identification section 212 are the same, the third determination section 217 determines that the setup process is not to be executed. Furthermore, as the result of determination performed by the second determination section 215, also when the value of the identified counter is not equal to or larger than the predetermined threshold Th1, the third determination section 217 determines that the setup process is not to be executed.

In contrast, in a case in which the result of determination performed by the first determination section 213 is negative and in which the result of determination performed by the second determination section 215 is positive, when a sheet-feeder number that is the same as the sheet-feeder number identified by the second identification section 212 is not included in the sheet-feeder numbers identified by the third identification section 216 (i.e., when images are to be formed on at least a predetermined number of recording media until switching to the immediately previous recording medium is performed after switching of a recording medium on which an image is to be formed is performed), the third determination section 217 determines that the setup process is to be executed.

In contrast, in a case in which the result of determination performed by the first determination section 213 is negative and in which the result of determination performed by the second determination section 215 is positive, when a sheet-feeder number that is the same as the sheet-feeder number identified by the second identification section 212 is included in the sheet-feeder numbers identified by the third identification section 216 (i.e., when images are not to be formed on at least the predetermined number of recording media until switching to the immediately previous recording medium is performed after switching of a recording medium on which an image is to be formed is performed), the third determination section 217 determines that the setup process is not to be executed.

The third determination section 217 is an example of a "controller" according to an exemplary embodiment of the present invention.

The functional configuration of the image forming system according to the present exemplary embodiment has been described above.

1-2. Operations

Figure 7:
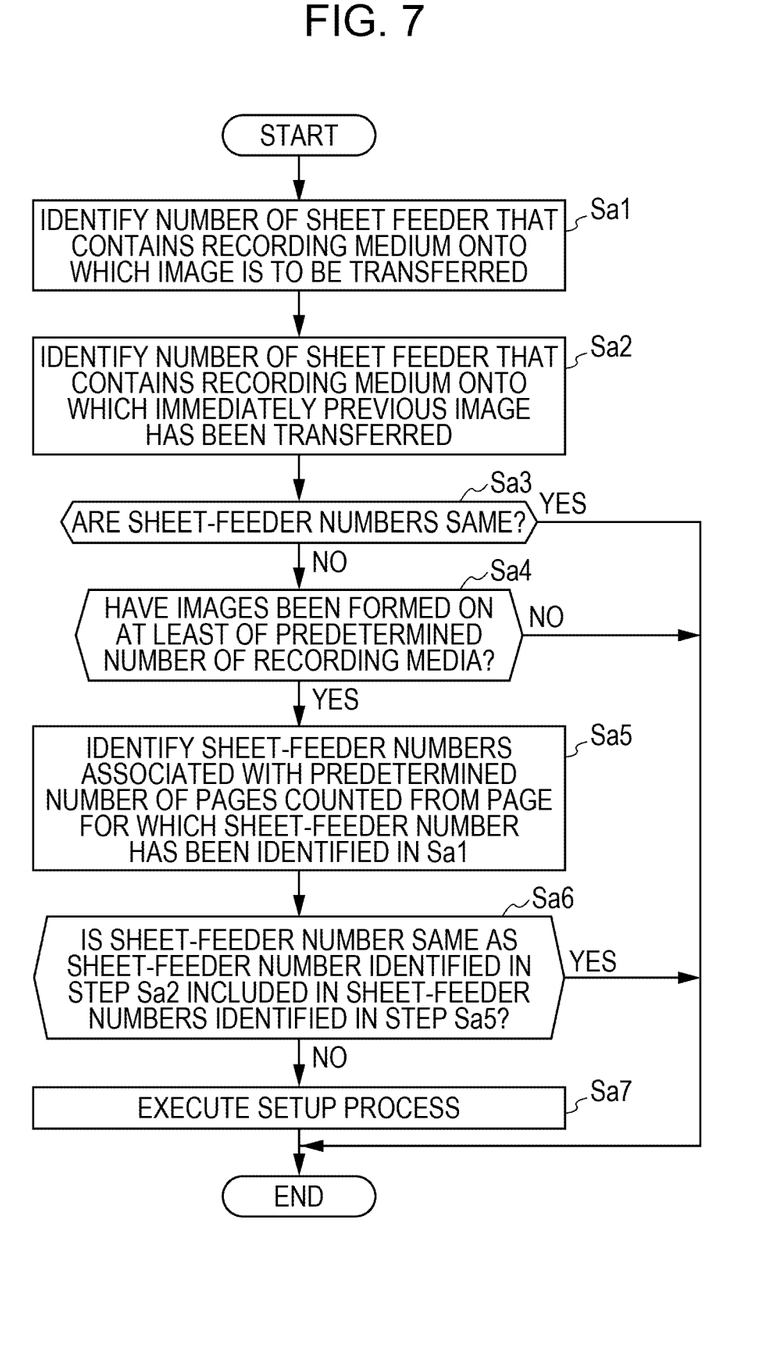
FIG. 7 is a flowchart of a setup execution determination process according to the exemplary embodiment.

Hereinafter, the setup execution determination process executed by the image forming apparatus 2 according to the present exemplary embodiment will be described. FIG. 7 is a flowchart of the setup execution determination process. The setup execution determination process is executed by executing, with the CPU, the program that is stored in the ROM of the image forming apparatus 2 and that is used for the setup execution determination process. More specifically, for example, the setup execution determination process is executed in synchronization with outputting of image data to the exposure device 32. Alternatively, the setup execution determination process may be executed in parallel to an image forming process executed by the image forming section 26, and may be executed for each of the developing devices 33 that are used for the individual colors.

First, in step Sa1, the controller 21 identifies the number of a sheet feeder that contains a recording medium onto which an image to be formed is to be transferred. More specifically, the controller 21 identifies, with reference to the print-data management table TBL2 stored in the memory 22, a sheet-feeder number that is registered so as to be associated with the a page of the image to be formed.

Next, regarding an image that has been transferred onto a recording medium immediately prior to the image for which the sheet-feeder number has been identified in step Sa1, the controller 21 identifies the number of a sheet feeder that has contained a recording medium onto which the image has been transferred (step Sa2). More specifically, the controller 21 identifies, with reference to the print-data management table TBL2 stoked in the memory 22, a sheet-feeder number that is registered so as to be associated with a page immediately previous to the page of the image for which the sheet-feeder number has been identified in step. Sa1.

Next, the controller 21 determines whether or not the sheet-feeder number identified in step Sa1 and the sheet-feeder number identified in step Sa2 are the same (step Sa3). In other words, the controller 21 determines whether or not switching of a recording medium on which an image is to be formed is to be performed.

As a result of determination, when the sheet-feeder numbers are the same (YES in step Sa3), the controller 21 finishes the setup execution determination process without executing the setup process. In contrast, when the sheet-feeder numbers are not the same (No in step Sa3), the controller 21 executes a process of step Sa4.

In step Sa4, the controller 21 determines whether or not images have been formed on at least the predetermined number of recording media since the setup process was executed for the sheet-feeder number identified in step Sa1. More specifically, the controller 21 identifies a counter associated with the sheet-feeder number identified in step Sa1, and determines whether or not the value of the counter is equal to or larger than the predetermined threshold Th1.

As a result of determination, when images have not been formed on at least the predetermined number of recording media (NO in step Sa4), the controller 21 finishes the setup execution determination process without executing the setup process. In contrast, as a result of determination, when images have been formed on at least the predetermined number of recording media (YES in step Sa4), the controller 21 executes a process of step Sa5.

In step Sa5, the controller 21 identifies sheet-feeder numbers associated with n pages that are counted from the page of the image for which the sheet-feeder number has been identified in step Sa1. More specifically, for example, the controller 21 identifies, with reference to the print-data management table TBL2, sheet-feeder numbers associated with ten pages that are counted from the page of the image for which the sheet-feeder number has been identified in step Sa1.

Next, the controller 21 determines whether or not a sheet-feeder number that is the same as the sheet-feeder number identified in step Sa2 is included in the sheet-feeder numbers identified in step Sa5 (step Sa6). In other words, the controller 21 determines whether switching to the immediately previous recording medium is to be performed again while images are being formed on at least the predetermined number of recording media after switching of a recording medium on which an image is to be formed is performed.

As a result of determination, a sheet-feeder number that is the same as the sheet-feeder number identified in step Sa2 is not included in the sheet-feeder numbers identified in step Sa5 (NO in step Sa6), the controller 21 executes the setup process (step Sa7). In contrast, as a result of determination, a sheet-feeder number that is the same as the sheet-feeder number identified in step Sa2 is included in the sheet-feeder numbers identified in step Sa5 (YES in step Sa6), the controller 21 finishes the setup execution determination process without executing the setup process.

The contents of the setup execution determination process according to the present exemplary embodiment have been described above.

Figure 8:
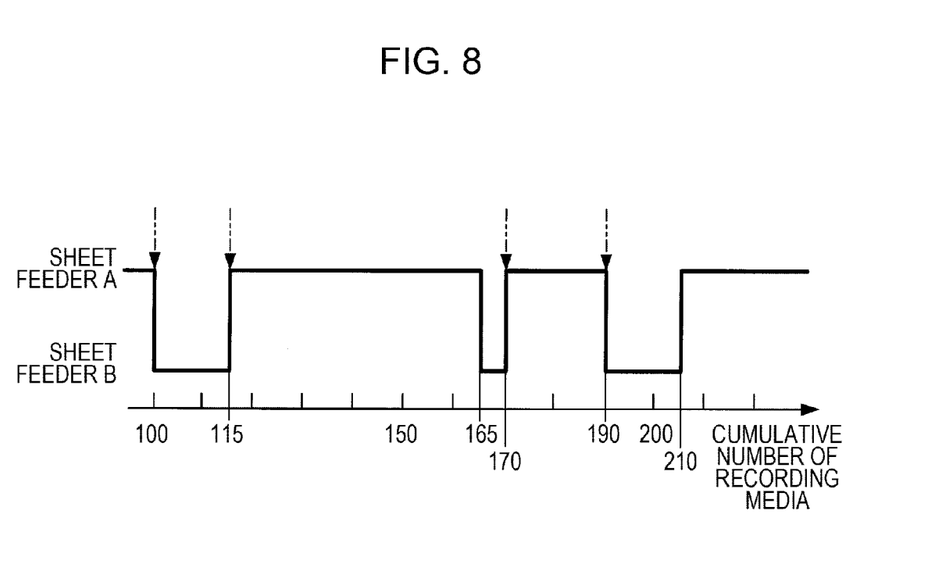
FIG. 8 is a diagram illustrating a specific example of a case in which the setup execution determination process is executed.

FIG. 8 is a diagram illustrating a specific example of a case in which the foregoing setup execution determination process is executed. In the example illustrated in FIG. 8, a state is illustrated, in which the setup process is executed in a case of switching a sheet feeder that is to be used between a sheet feeder A and a sheet feeder B. In FIG. 8, the horizontal axis indicates the cumulative number of recording media on the surfaces of which images have been formed. Arrows indicate times at which the setup process is executed. Note that, in the description given below, it is supposed that the threshold Th1 is "50", and that the value n is "10".

In the example illustrated in FIG. 8, the sheet feeder is switched from the sheet feeder A to the sheet feeder B at a point in time when the cumulative number of recording media reaches 165. Up to this point in time, images have been formed on 65 recording media since the setup process was immediately previously executed on the sheet feeder B (since the cumulative number of recording media was 100). In other words, the cumulative number of recording media that has been counted since the setup process was immediately previously executed exceeds the threshold Th1 ("50"). However, images are to be formed on only five recording media after the sheet feeder is switched from the sheet feeder A to the sheet feeder B, and, then, the sheet feeder is to be used is to be switched from the sheet feeder B to the sheet feeder A. In other words, the cumulative number of recording media that is to be counted after the sheet feeder is switched to the sheet feeder B is smaller than the value n ("10"). Accordingly, at the point in time when the cumulative number of recording media reaches 165, the setup process is not executed.

Next, in the example illustrated in FIG. 8, the sheet feeder is switched from the sheet feeder B to the sheet feeder A at a point in time when the cumulative number of recording media reaches 170. Up to this point in time, images have been formed on 55 recording media since the setup process was immediately previously executed on the sheet feeder A (since the cumulative number of recording media was 115). In other words, the cumulative number of recording media that has been counted since the setup process was immediately previously executed exceeds the threshold Th1 ("50"). Furthermore, images are to be formed on 20 recording media until the sheet feeder is switched to the sheet feeder B after the sheet feeder is switched to the sheet feeder A. In other words, the cumulative number of recording media that is to be counted after the sheet feeder is switched to the sheet feeder A exceeds the value n ("10"). Accordingly, the setup process is executed at the point in time when the cumulative number of recording media reaches 170.

Next, in the example illustrated in FIG. 8, the sheet feeder is switched from the sheet feeder B to the sheet feeder A at a point in time when the cumulative number of recording media reaches 210. However, up to this point in time, the cumulative number of recording media that has been counted since the setup process was immediately previously executed on the sheet feeder A (since the cumulative number of recording media was 170) is 40. In other words, the cumulative number of recording media is smaller than the threshold Th1 ("50"). Accordingly, at the point in time, the setup process is not executed.

A specific example of the case in which the foregoing setup execution determination process is executed has been described above.

In the setup execution determination process according to the present exemplary embodiment, which has been described above, even in a case in which the image formation condition is changed, when images are not to be formed on at least the predetermined number of recording media until the image formation condition is returned to the immediately previous image formation condition, the setup process is not executed. Accordingly, a reduction in the number of printed sheets per unit time, which is caused by execution of the setup process, is prevented.

Furthermore, in the setup execution determination process, even in a case in which the image formation condition is changed, when images have not been formed on at least the predetermined number of recording media since the setup process was immediately previously executed for an image formation condition that is a destination to which the image formation condition is switched, the setup process is not executed. Accordingly, in this regard, a reduction in the number of printed sheets per unit time, which is caused by execution of the setup process, is further prevented.

2. Modification Examples

The foregoing exemplary embodiment may be modified as follows. Furthermore, modification examples given below may be combined with each other.

2-1. First Modification Example

Figure 9:
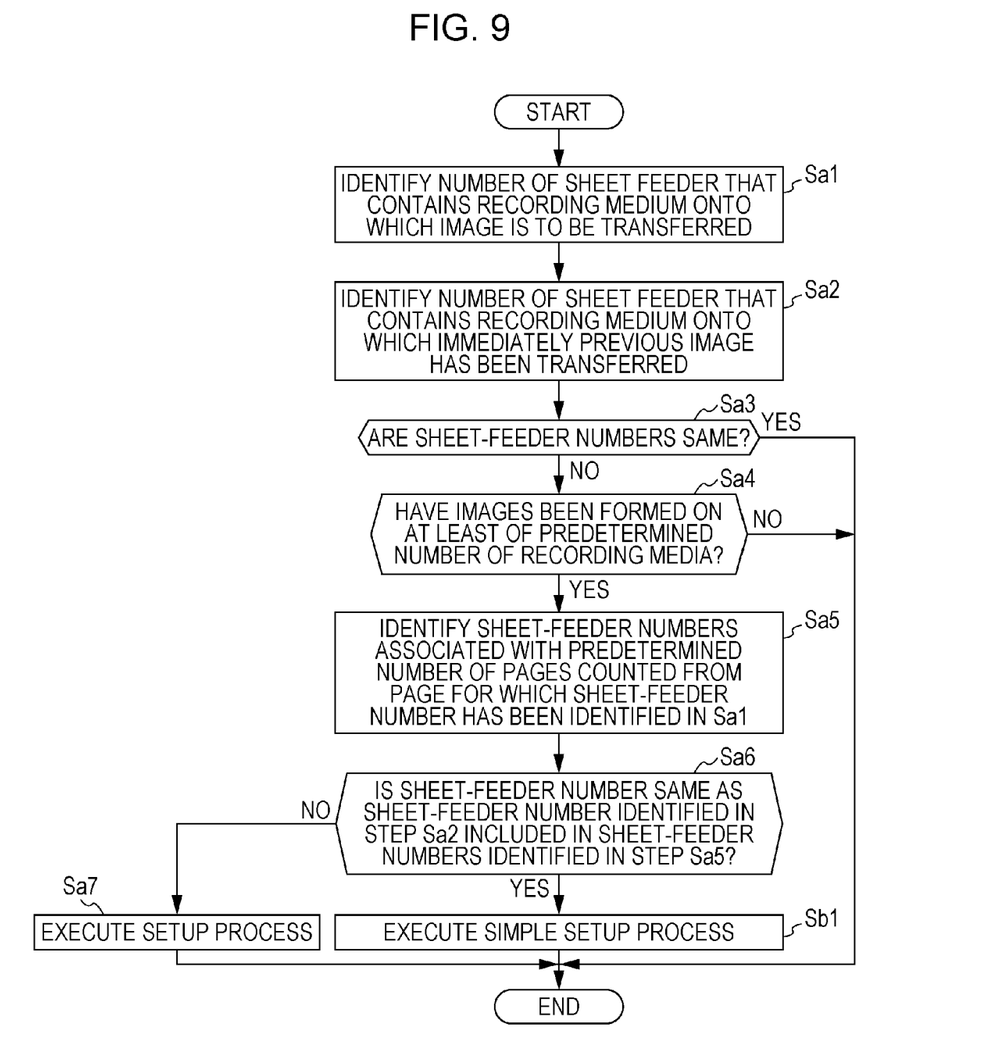
FIG. 9 is a flowchart of a setup execution determination process according to a modification example.

In the foregoing exemplary embodiment, when the number of recording media on which images are to be formed after the image formation condition is switched is smaller than n, the setup process is not executed. However, even in such a case, a simple setup process may be executed. FIG. 9 is a flowchart of a setup execution determination process according to a modification example.

In FIG. 9, processes that are the same as the processes illustrated in FIG. 7 may be denoted by the same reference numerals, and a description thereof is omitted. In FIG. 9, when a result of determination in step Sa6 is positive (YES in step Sa6), a simple setup process is executed (step Sb1). Here, the simple setup process is, for example, a setup process in which the number of formed patch images is smaller than that in the setup process executed in step Sa1.

Note that, in a case of application of the present modification example, whether the simple setup process is to be executed or the setup process is not to be executed at all may be selected by a user. For example, in the flowchart illustrated in FIG. 9, a process of determining whether the simple setup process is to be executed or the setup process is not to be executed at all may be provided before the process of step Sb1, and the processes thereafter may be executed on the basis of a result of determination that is obtained by performing the process.

Note that a setting for determining whether the simple setup process is to be executed or the setup process is not to be executed at all is set, for example, by a user using the user-operation section 24, and data regarding the setting is stored in the memory 22.

2-2. Second Modification Example

In the foregoing exemplary embodiment, even in a case in which the image formation condition is switched, when the number of recording media on which images are to be formed after the image formation condition is switched is smaller than n, the setup process is not executed. However, the condition where "the number of recording media on which images are to be formed after the image formation condition is switched is smaller than n" may be replaced with a condition where "the image formation condition is to be returned to the immediately previous image formation condition within a predetermined time period after the image formation condition is switched". More specifically, the controller 21 may execute the following processes instead of the processes of steps Sa5 and Sa6 in the foregoing setup execution determination process.

First, the controller 21 identifies, with reference to the print-data management table TBL2, the number of pages that are associated with the sheet-feeder number identified in step Sa1 and that are successively arranged from the page for which the sheet-feeder number has been identified in step Sa1.

Next, the controller 21 multiplies the identified number of pages by a predetermined coefficient to obtain a value. Here, the predetermined coefficient is a coefficient that is set for each sheet-feeder number (more specifically, each sheet size), and is a value that is used to calculate an approximate time period which is necessary for image formation.

Next, the controller 21 compares the obtained value with a predetermined threshold Th2. Here, the threshold Th2 is, for example, "60 (seconds)". Then, as a result of comparison, when the obtained value is equal to or larger than the threshold Th2, the controller 21 executes the setup process (step Sa7). In contrast, when the obtained value is smaller than the threshold Th2, the controller 21 finishes the setup execution determination process without executing the setup process.

2-3. Third Modification Example

In the foregoing exemplary embodiment, even in a case in which the image formation condition is switched, when images have not been formed on at least a predetermined number of recording media since the setup process was immediately previously executed, the setup process is not executed. However, the condition where "images have not been formed on at least a predetermined number of recording media since the setup process was immediately previously executed" may be replaced with a condition where "images have not been formed on at least a predetermined number of recording media since an image was last formed under an image formation condition that is a destination to which the image formation condition is switched".

In this case, each of the counters of the counter section 214 is set so as to count the number of recording media on which images are formed using the sheet feeder that is not the sheet feeder associated with the counter, and so as to reset the value of the counter when an image is formed using the sheet feeder associated with the counter.

2-4. Fourth Modification Example

In the foregoing exemplary embodiment, the tone correction table is corrected as a result of the setup process. However, the correction target may be other than the tone correction table. For example, the correction target may be a charge potential in a case of charging the photoconductor drums 30 with the chargers 31, an exposure amount of the exposure device 32, a development bias of the developing devices 33, and a transfer bias of the first transfer rollers 37 or the second transfer roller 39. In other words, the chargers 31, the exposure device 32, the developing devices 33, the first transfer rollers 37, and the second transfer roller 39 may be examples of the "operation section" according to an exemplary embodiment of the present invention.

2-5. Fifth Modification Example

In the foregoing exemplary embodiment, even in a case in which the image formation condition is switched, when the number of recording media on the surfaces of which images are to be formed after the image formation condition is switched is smaller than n, the setup process is not executed. More specifically, in the foregoing setup execution determination process, when a sheet-feeder number that is the same as the sheet-feeder number identified in step Sa2 is included in the sheet-feeder numbers identified in step Sa5, the setup process is not executed. However, in such a case, when the same sheet-feeder numbers are associated with the same print-data ID (i.e., when an instruction for forming images using different sheet feeders is provided in the same print data), the setup process may be executed.

For example, in the foregoing setup execution determination process, first, in steps Sa2 and Sa5, the controller 21 identifies sheet-feeder numbers and print-data IDs associated with the sheet-feeder numbers. Then, in step Sa6, the controller 21 determines whether a sheet-feeder number that is the same as the sheet-feeder number identified in step Sa2 is included in the sheet-feeder numbers identified in step Sa5. Then, as a result of determination, when a sheet-feeder number that is the same as the sheet-feeder number identified in step Sa2 is included, the controller 21 compares the print-data ID associated with the same sheet-feeder number with the print-data ID associated with the sheet-feeder number identified in step Sa2. As a result of comparison, when the print-data IDs are the same, the controller 21 executes the setup process (step Sa7). In contrast, when the print-data IDs are not the same, the controller 21 finishes the setup execution determination process without executing the setup process.

2-6. Sixth Modification Example

In the foregoing exemplary embodiment, the sheet-feeder number (more specifically, the type of sheet) is provided as an example of the image formation condition, and the setup process is basically executed in accordance with change in the sheet-feeder number. However, the image formation condition that is referred to in a case of determining whether or not the setup process is to be executed may be other than the sheet-feeder number. For example, the screen ruling may be used. The screen ruling is an example of the "image formation condition" according to an exemplary embodiment of the present invention.

2-7. Seventh Modification Example

In the foregoing exemplary embodiment, the program that is executed by the CPU of the image forming apparatus 2 and that is used for the setup execution determination process may be provided in a state in which the program is stored on a storage medium such as a magnetic tape, a magnetic disk, a flexible disk, an optical disk, a magneto-optical disk, or a memory, and may be installed in the image forming apparatus 2. Alternatively, the program may be downloaded to the image forming apparatus 2 via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control apparatus comprising:
   an operation section that performs an operation for forming an image having a predetermined density;
   a correction section that corrects a value of the predetermined density; and
   a controller that, in response to determining that an image formation condition is switched from a first image formation condition to a second image formation condition, determines whether image formation under the second image formation condition is to be performed on at least a first predetermined number of recording media or to be performed for at least a first predetermined time period,
   wherein, in response to determining that the image formation under the second image formation condition is to be performed on at least first the predetermined number of recording media or to be performed for at least the first predetermined time period, the controller performs control so that the correction section executes a process of correcting the value of the predetermined density prior to starting the image formation under the second image formation condition,
   wherein, in response to determining that the image formation under the second image formation condition is not to be performed on at least the first predetermined number of recording media or not to be performed for at least the first predetermined time period, the controller performs control so that the correction section does not execute the process of correcting the value of the predetermined density, and
   wherein the process of correcting the value of the predetermined density is performed prior to starting the image formation under the second image formation condition in response to determining that a second predetermined time period has elapsed or image formation has been performed on a second predetermined number of recording media since the value of the predetermined density was last corrected by the correction section for the image formation under the second image formation condition, in addition to determining that image formation under the second image formation condition is to be performed on at least the first predetermined number of recording media or to be performed for at least the first predetermined time period.

2. The control apparatus according to claim 1, wherein, in a case in which the value of the predetermined density has already been corrected by the correction section, when the second predetermined time period has not elapsed or image formation has not been performed on the second predetermined number of recording media since a last time that the image formation condition is switched from the first image formation condition to the second image formation condition, the controller performs control so that the correction section does not execute the process of correcting the value of the predetermined density.

3. The control apparatus according to claim 1, wherein the process of correcting the value of the predetermined density is performed in response to determining that a first predetermined time period under the second condition has elapsed or image formation has been performed under the second condition on a first predetermined number of recording media since the value of the predetermined density was last corrected by the correction section, in addition to determining that image formation under the second image formation condition is to be performed on at least a second predetermined number of recording media or to be performed for at least a second predetermined time period.

4. The control apparatus according to claim 1, wherein the first image formation condition corresponds to a first sheet feeder and the second image formation condition corresponds to a second sheet feeder different from the first sheet feeder.

5. An image forming apparatus comprising:
   a density change section that changes, on the basis of a first value, a density of an image represented by image data;
   an image carrier;
   a charging section that charges a surface of the image carrier on the basis of the image data whose density has been changed by the density change section and on the basis of a second value;
   a light exposure section that exposes the surface of the image carrier, which has been charged by the charging section, to light on the basis of a third value to form an electrostatic latent image;
   a developing section that contains toner, and that develops, using the toner, the electrostatic latent image, which has been formed by the light exposure section, on the basis of a fourth value to form a toner image;
   a transfer section that transfers the toner image, which has been formed by the developing section, onto a medium on the basis of a fifth value;
   a correction section that corrects at least one of the first to fifth values; and
   a controller that, in response to determining that an image formation condition is switched from a first image formation condition to a second image formation condition, determines whether image formation under the second image formation condition is to be performed on at least a first predetermined number of recording media or to be performed for at least a first predetermined time period,
   wherein, in response to determining that the image formation under the second image formation condition is to be performed on at least the first predetermined number of recording media or to be performed for at least the first predetermined time period, the controller performs control so that the correction section executes a process of correcting at least one of the first to fifth values prior to starting the image formation under the second image formation condition, wherein, in response to determining that the image formation under the second image formation condition is not to be performed on at least the first predetermined number of recording media or not to be performed for at least the first predetermined time period, the controller performs control so that the correction section does not execute the process of correcting at least one of the first to fifth values, and wherein the process of correcting the at least one of the first to fifth values is performed prior to starting the image formation under the second image formation condition in response to determining that a second predetermined time period has elapsed or image formation has been performed on a second predetermined number of recording media since the at least one of the first to fifth values was last corrected by the correction section for the image formation under the second image formation condition, in addition to determining that image formation under the second image formation condition is to be performed on at least the first predetermined number of recording media or to be performed for at least the first predetermined time period.

6. The image forming apparatus according to claim 5, wherein the first image formation condition corresponds to a first sheet feeder and the second image formation condition corresponds to a second sheet feeder different from the first sheet feeder.

7. A control apparatus comprising:
an operation section that performs an operation for forming an image having a predetermined density;
a correction section that corrects a value of the predetermined density; and
a controller that, in response to determining that an image formation condition is switched from a first image formation condition to a second image formation condition, determines whether image formation under the second image formation condition is to be performed on at least a first predetermined number of recording media or to be performed for at least a first predetermined time period, wherein, in response to determining that the image formation under the second image formation condition is to be performed on at least the first predetermined number of recording media or to be performed for at least the first predetermined time period, the controller performs control so that the correction section performs first correction on the value of the predetermined density prior to starting the image formation under the second image formation condition, wherein, in response to determining that the image formation under the second image formation condition is not to be performed on at least the first predetermined number of recording media or not to be performed for at least the first predetermined time period, the controller performs control so that the correction section performs second correction on the value of the predetermined density, an execution time of the second correction being shorter than that of the first correction, and wherein the process of correcting the value of the predetermined density is performed prior to starting the image formation under the second image formation condition in response to determining that a second predetermined time period has elapsed or image formation has been performed on a second predetermined number of recording media since the value of the predetermined density was last corrected by the correction section for the image formation under the second image formation condition, in addition to determining that image formation under the second image formation condition is to be performed on at least the first predetermined number of recording media or to be performed for at least the first predetermined time period.

8. The control apparatus according to claim 7, wherein the first image formation condition corresponds to a first sheet feeder and the second image formation condition corresponds to a second sheet feeder different from the first sheet feeder.

* * * * *